No. 719,036. PATENTED JAN. 27, 1903.
J. PEDERSON.
RAILROAD SPIKE.
APPLICATION FILED JULY 24, 1902.
NO MODEL.

Inventor
Jacob Pederson,

Witnesses

By H. B. Willson & Co.
Attorneys

UNITED STATES PATENT OFFICE.

JACOB PEDERSON, OF ROSEAU, MINNESOTA.

RAILROAD-SPIKE.

SPECIFICATION forming part of Letters Patent No. 719,036, dated January 27, 1903.

Application filed July 24, 1902. Serial No. 116,824. (No model.)

*To all whom it may concern:*

Be it known that I, JACOB PEDERSON, a citizen of the United States, residing at Roseau, in the county of Roseau and State of Minnesota, have invented certain new and useful Improvements in Railroad-Spikes; and I do declare the following to be a full, clear, and exact description of the invention, such as will enable others skilled in the art to which it appertains to make and use the same.

The invention relates to railroad-spikes.

The object of the invention is to provide a spike with means whereby when the spike is driven home it may be locked in position against accidental withdrawal or retraction.

With this and other objects in view the invention consists of certain novel features of construction, combination, and arrangement of parts, which will be hereinafter more fully described, and particularly pointed out in the appended claims.

Figure 1:
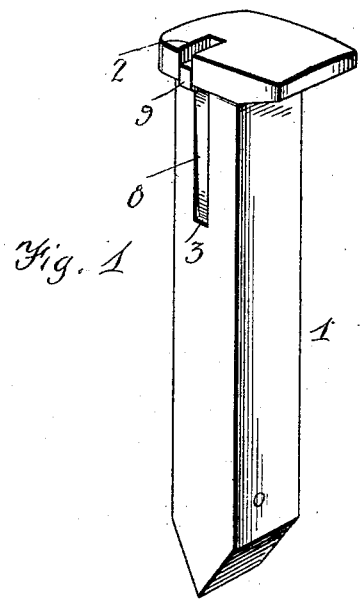
Figure 2:
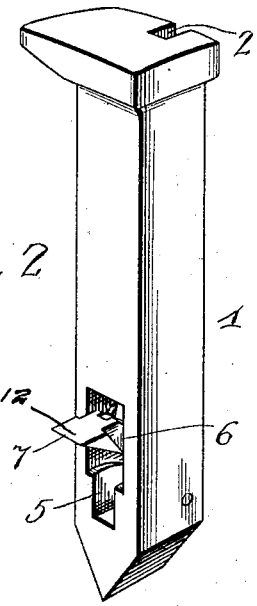
Figure 3:
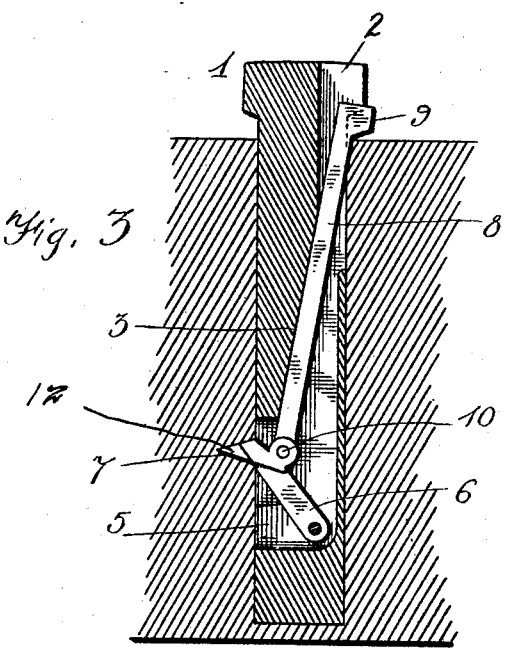

In the accompanying drawings, Figure 1 is a perspective view of a spike, taken from one side. Fig. 2 is a similar view taken from the opposite side with the dog protruded; and Fig. 3 is a transverse sectional view through the spike and tie, showing the locking-dog driven into the tie to prevent the withdrawal of the spike.

Referring to the drawings, 1 denotes the spike, which in general outline may be of any well-known or approved construction. The head 1 of the spike is formed with a vertical aperture 2 at one side thereof, and the body is formed with a bore 3, which communicates with said aperture and extends diagonally lengthwise the body of the spike and communicates with the dog-chamber 5.

6 denotes a dog having one end pivoted in said chamber and having its opposite end formed with a beveled or chiseled head 7.

8 denotes a push-bar having formed at its upper end a head 9, which is located in the aperture 2 of the head of the spike, the body portion of the bar being located in the bore and free to vibrate therein and the lower end being pivoted to the dog by a pivot 10.

In driving the spike the chiseled head of the dog is located within its chamber, and due to the inclined face 12 of the dog any tendency of the dog to work out of its chamber in the driving movement of the spike is resisted by reason of the inclined face coming in contact with the fiber of the tie or other body into which the spike is driven and forcing the head and dog back into the chamber. After the spike has been driven a tool or implement is inserted in the hole 2 of the head and the head of the driving-bar driven slightly downward, which action forces the head of the locking-dog outwardly to bury the same into the fiber of the wood, and thus prevent the accidental withdrawal or retraction of the spike. The shape of the head of the dog is such that it may be easily and quickly forced into the wood after the spike has been driven home, and when in the position shown in Fig. 3 it is absolutely impossible for the spike to accidentally work loose.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. A spike having a dog-chamber and a bore communicating with the dog-chamber, a dog located in said chamber, and a push-bar free to vibrate within said bore and pivotally connected to said dog, substantially as described.

2. A spike having an aperture formed in its head and a bore extending diagonally lengthwise the body portion of the spike and communicating with said aperture, said spike having a chamber formed at its lower end in communication with the bore and opening at the side of the spike, in combination with a dog having its inner end pivoted in said chamber and provided with a chiseled or beveled head which is adapted to be projected through the chamber and buried into the material into which the spike is driven, and a bar located in the bore and pivotally connected to the dog and having its upper end projecting into the aperture in the head of the spike, substantially as set forth.

In testimony whereof I have hereunto set my hand in presence of two subscribing witnesses.

JACOB PEDERSON.

Witnesses:
 A. WOOG,
 JACOB WURSCHMIDT.